United States Patent [19]
Babbs

[11] Patent Number: 4,778,139
[45] Date of Patent: Oct. 18, 1988

[54] HEIGHT ADJUSTMENT MECHANISM
[75] Inventor: Frederick W. Babbs, Nottingham, England
[73] Assignee: TI Cox Limited, Nottingham, England
[21] Appl. No.: 23,074
[22] Filed: Mar. 6, 1987
[30] Foreign Application Priority Data Mar. 5, 1986 [GB] United Kingdom ............... 8605375

[51] Int. Cl.⁴ .............................................. F16M 13/00
[52] U.S. Cl. ..................................... 248/421; 297/347
[58] Field of Search ............... 248/396, 421, 394, 419; 297/346, 348, 345, 347

[56] References Cited
U.S. PATENT DOCUMENTS

| | | | |
|---|---|---|---|
| 2,132,009 | 10/1935 | Ball . | |
| 2,789,622 | 4/1957 | Dingman et al. | 248/419 |
| 3,149,815 | 9/1964 | Cotter et al. | 248/421 |
| 3,912,215 | 10/1975 | Reinmoller | 248/419 X |
| 4,015,812 | 4/1977 | Heech | 248/396 X |
| 4,128,225 | 12/1978 | Kluting | 248/421 |
| 4,159,095 | 6/1979 | Pallant | 248/396 |
| 4,222,543 | 9/1980 | Gedig | 248/421 X |
| 4,326,690 | 4/1982 | Pickles et al. . | |
| 4,333,627 | 6/1982 | Dembinski | 248/396 |
| 4,356,990 | 11/1982 | Sakurada et al. . | |
| 4,422,611 | 12/1983 | Kitsuda | 248/421 |
| 4,529,159 | 7/1985 | Terada et al. . | |
| 4,556,185 | 12/1985 | Takagi | 248/421 |
| 4,687,251 | 8/1987 | Kazaoka et al. | 248/419 |

FOREIGN PATENT DOCUMENTS

| | | |
|---|---|---|
| 0197638 | 10/1980 | European Pat. Off. . |
| 2236900 | 2/1974 | Fed. Rep. of Germany . |
| 1273890 | 5/1972 | United Kingdom . |
| 2054731 | 2/1981 | United Kingdom . |

Primary Examiner—J. Franklin Foss
Attorney, Agent, or Firm—Millen & White

[57] ABSTRACT

A mechanism for adjusting the height of a vehicle seat (13) comprises a pair of front and rear bell cranks (16, 19) pivoted on a fore and aft seat slide (12) at each side of the seat. One end (15, 18) of each crank is pivoted to the front or rear of the seat and the other ends (23, 24) are interconnected by a link (23).

Height adjustment is achieved by turning one of the cranks by a handle (31).

23 Claims, 4 Drawing Sheets

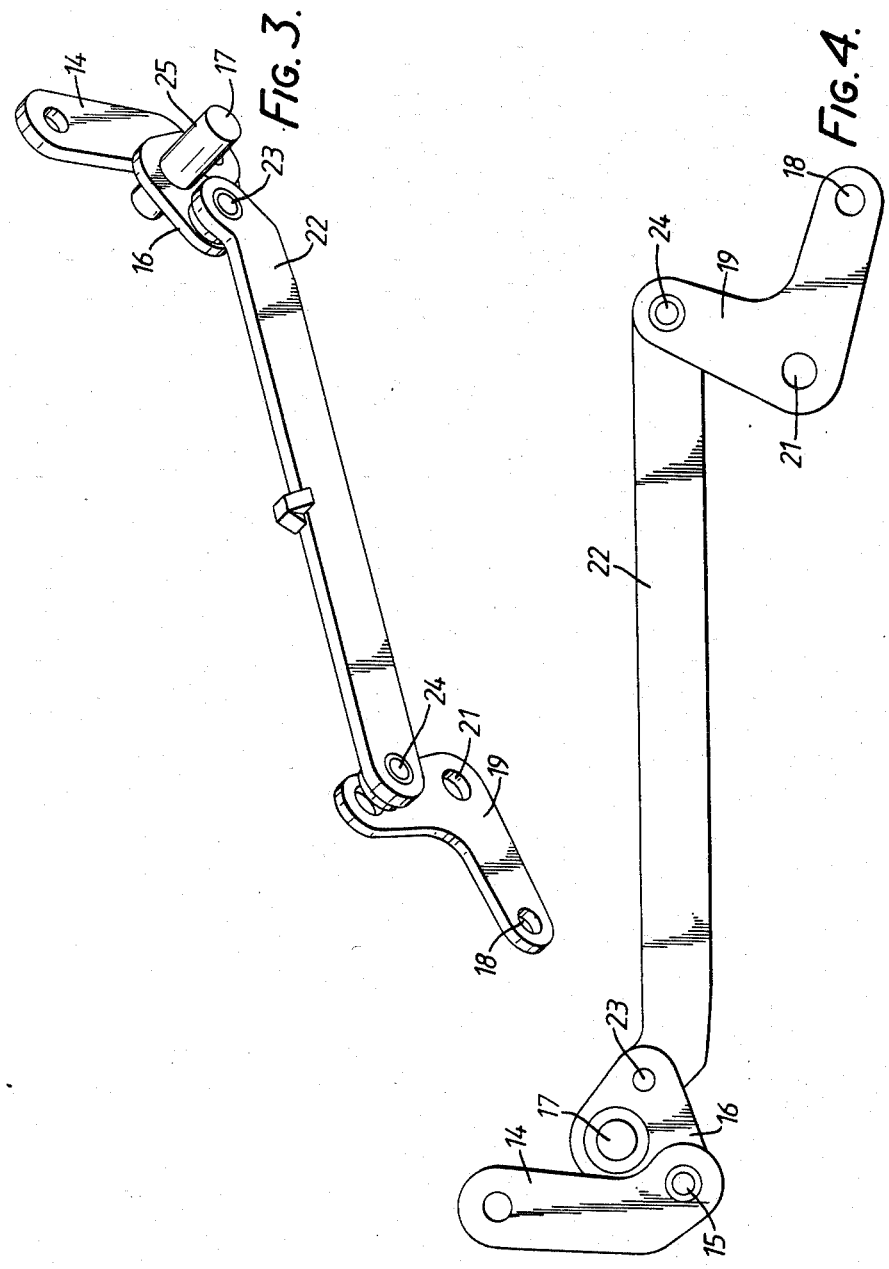

HEIGHT ADJUSTMENT MECHANISM

BACKGROUND OF THE INVENTION

This invention relates to height adjustment mechanism for example for a seat in a vehicle although it is equally applicable to adjusting the heights of tables or other components.

There have been proposals for adjusting the height of a vehicle seat by the use of toothed racks or other forms of gearing which can be rotated to adjust the height of the front and the rear of the seat independently but such gearing systems tend to be rather expensive to manufacture and rater susceptible to wear and failure.

One object of the present invention is to provide a height adjustment mechanism which does not have recourse to gearing.

According to the present invention height adjustment mechanism for a component, for example a vehicle seat, comprises a pair of cranks interconnected by a pivotal link and arranged to support the component at two spaced locations, together with means for turning one of the cranks.

Conveniently, there will be a pair of bell cranks mounted to be rotatable about parallel axes spaced apart on a support member. Then one arm of one bell crank can be connected to one arm of the other bell crank through the pivoted link so that turning of one crank will automatically cause the other to turn.

The other arm of each bell crank can be arranged so that throughout the full range of movement the arm will move from below the horizontal to above the horizontal so that the movement of the free end of that arm and thus the movement of the component being supported will be generally vertical.

The amounts of movement at front and rear i.e. the spaced locations, can be designed to be about the same so that the component will be raised and lowered with generally parallel movement or the movement may be designed to be proportional by appropriate design of the length of the bell crank arms so that for example the rear will move by a proportionately greater amount than the front.

Conveniently, the pivoted link ensures that when one bell crank moves clockwise the other is moved anti-clockwise.

The bell cranks may be mounted on the moveable slide of a seat fore/aft slide assembly which enables the fore-aft position of the seat to be adjusted in addition to the adjustment provided by the height adjustment mechanism.

There will conveniently be two adjustment mechanisms one at each side of the seat with the seat pivotally connected to th free ends of the front and rear bell cranks. One bell crank may include a pivotal link connecting it to the seat so that the complete linkage including the seat connected to the links will be a four link linkage.

Rotation of the one bell crank could be by means of an electric motor, preferably through reduction gearing, and then if there is a height adjustment mechanism at each side of the seat the motor can have a flexible drive cable at each end connected to one of the bell cranks at each side.

Alternatively, adjustment may be manual by operation of a handle clutched to a shaft defining the pivot axis of one bell crank and preferably extending transversely underneath the seat to define the pivotal axis of the corresponding bell crank on the adjustment mechanism at the other side of the seat.

It is desirable to provide a clutch for preventing further rotation of the bell cranks when a desired height adjustment has been effected and such a clutch could be associated with the manual or electrical drive means for providing the adjustment.

The clutch is preferably of the kind which is normally engaged to prevent rotation of the bell cranks, but in which any adjustment movement automatically releases the clutch until, when movement ceases, the clutch automatically re-engages. Such a clutch is described in U.S. Pat. No. 2,132,009 which is incorporated herein by reference.

Spring means, preferably in the form of a coiled spring around the shaft defining the bell crank pivotal axis, can be provided for tending to lift the seat against the weight of an occupant so that the load required to raise it will not be excessive.

The invention can be considered to reside in any of the features discussed above either alone or in any combination and possibly also in combination with any feature of European patent application No. 86.05375.

BRIEF DESCRIPTION OF THE DRAWINGS

The invention may be carried into practice in various ways and one embodiment will now be described by way of example with reference to the accompanying drawings in which:

FIG. 3 is an isometric view of the components of the adjusting link mechanism of FIGS. 1 and 2;

FIG. 4 is a side elevation of the components shown in FIG. 3; and

DESCRIPTION OF THE PREFERRED EMBODIMENTS

Figure 1:
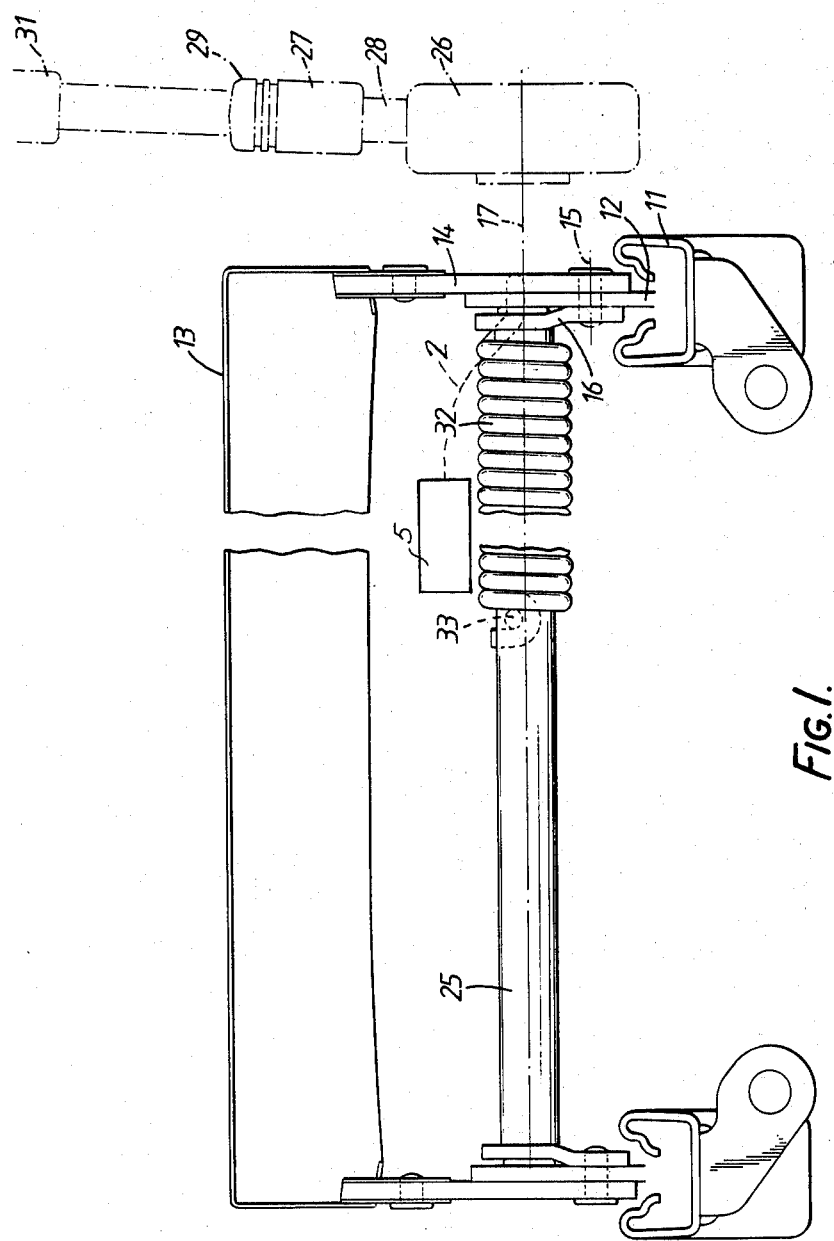
FIG. 1 is a front elevation of a car seat adjusting mechanism.

European Patent Application No. 86 301203.5 incorporated herein by reference was filed on Feb. 20, 1986 claiming priority from British Patent Application Nos. 85 04625 filed Feb. 22, 1985 and 85 06431 filed Mar. 13, 1985, both also incorporated herein by reference. The application was published on Oct. 15, 1986 under No. 0 197 638. The mechanism the subject of that European application was for adjustably mounting a seat in a vehicle with provision for fore-aft adjustment. The mechanism disclosed in these patents included an electric motor 5 and a flexible drive cable 2 for effecting height adjustment. FIG. 1 of the present drawings indicates these components diagrammatically.

The mechanism also provided for front and rear height adjustment of the seat in relation to a floor. There was a similar slide assembly underneath each side of the seat connecting the seat to the floor and making provision for the necessary adjustments to suit the convenience of the sitter.

The height adjustment mechanism included toothed gear arrangements at front and rear of the slide assembly which could be manually or electrically driven.

The present invention is concerned with a simplification of the height adjustment mechanism of each slide assembly which could replace the height adjustment mechanism described in the above application. In other respects the features of that application can apply to a vehicle seat and accordingly the contents of that application are included in this application by reference.

Figure 2:
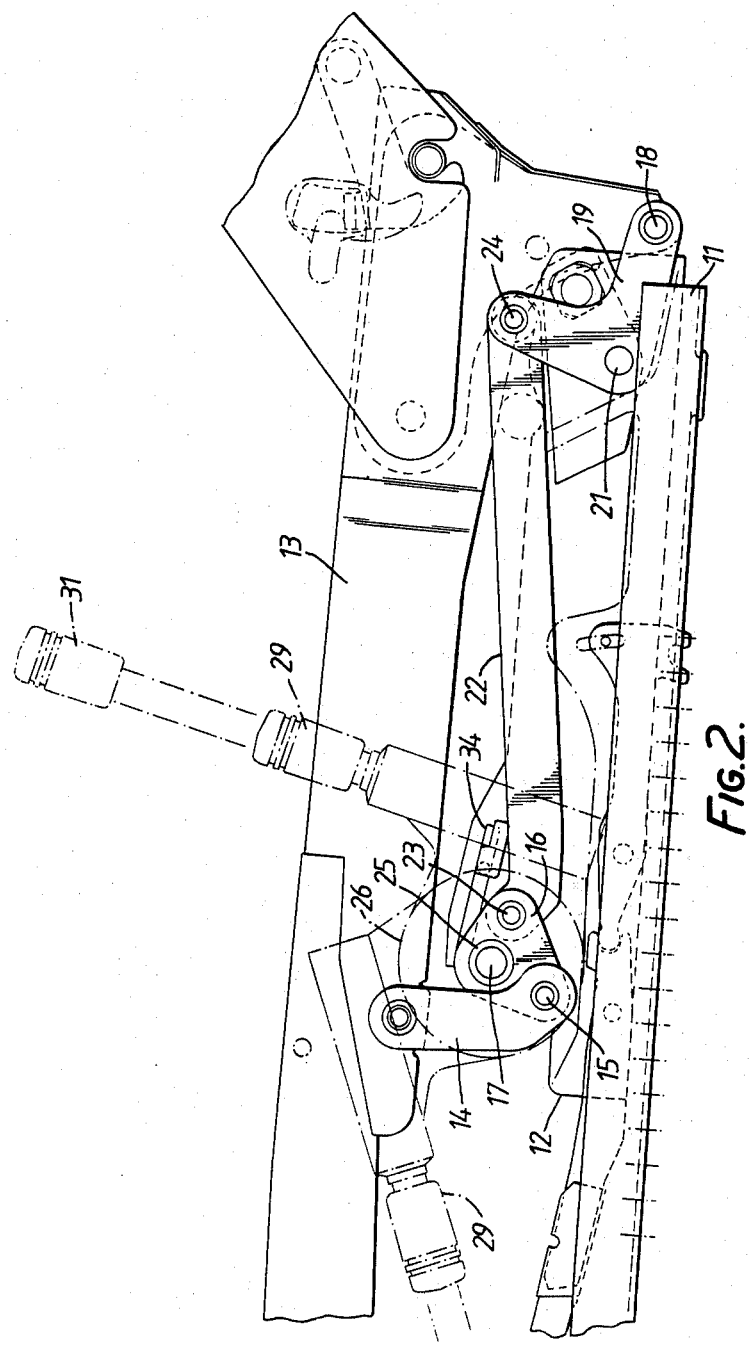
FIG. 2 is a side elevation of the mechanism of FIG. 1.

As shown in FIGS. 1 and 2 each slide assembly comprises a lower channel section slide 11 and an upper slide 12, the precise form of which is not shown in this specification but may be the same as shown in the above European specification. There is a similar slide assembly underneath each side of the seat which is shown generally at 13.

The seat 13 is pivotally supported at each side at the front at the upper end of a strut or first link 14, the lower or first end of which is pivoted at 15 to a bell crank 16 at a first end thereof, which bell crank can pivot about a horizontal intermediate pivot axis 17 defined on the upper slide 12.

The rear of the seat is pivoted at 18 on a first end of a rear bell crank 19 pivotally mounted by an intermediate pivot axis on the upper slide at 21. A second link 22 is pivotally connected between the bell cranks 16 and 19 respectively at 23 and 24 located at second ends of the bell cranks 16 and 19 respectively. The first and second bell cranks 16 and 19 rotate in opposite directions because the second link 22 has its first end pivoted to the second end of the first crank 16 at a pivot pointg 23 which is below the horizontal intermediate pivot axis 17 while the second end of the second link 22 is pivoted to the second end of the link 19 at a pivot point location 24 which is above the hroizontal intermediate pivot axis 21.

The pivotal axis 17 for the front bell crank 16 is defined by a transverse shaft 25 which extends under the front of the seat between the two slide assemblies and projects at one side to carry a clutch 26 which is operated by a handle 27 on a shaft 28.

The handle and shaft are adjustable between a retracted position shown at 29 and an extended position shown at 31 for use when adjustment is needed.

The clutch 26 is of the kind described in U.S. Pat. No. 2,132,009, incorporated herein by reference, which is normally engaged frictionally to prevent any relative turning between the bell crank 16 and the slide 12.

If the handle 27 is turned in either sense about a transverse horizontal axis, the clutch is released in response to the turning movement and the bell crank 16 is turned with the handle to raise or lower the seat. Once the handle is released, the clutch re-engages to hold the bell crank 16 in the new angular position. The clutch handle 27 and shaft 28 are secured to the body of the clutch 26 and the two extreme positions are indicated in respective chain lines in FIG. 2. The reference number 29 is used twice to show the extreme positions of the retracted handle.

A helical coil spring 32 is engaged with a pin 33 projecting from the transverse shaft 25 and with a notch 34 in the left-hand upper slide 12 so as to tend to uncoil and thus to tend to lift the front of the seat against the tendency of the weight of the seat and its occupant to lower the front of the seat.

The spring assists the occupant in raising the seat while he is sitting in it. The telescopic handle also assists.

Figure 5:
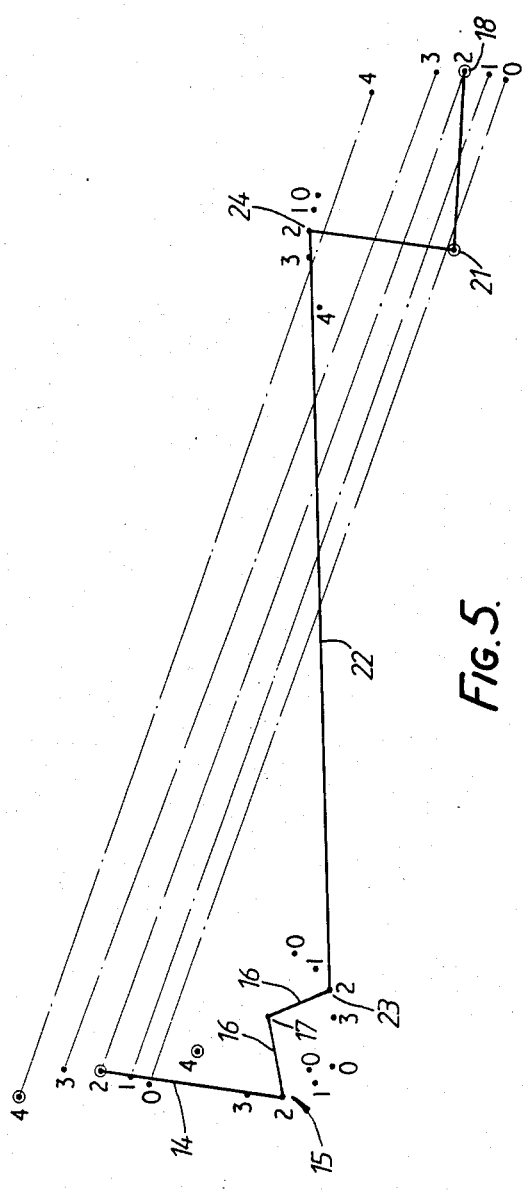
FIG. 5 is a diagram corresponding to FIG. 4 and showing the locus of the positions of the various connections in the elevation of FIG. 4 over the range of adjustment of the mechanism.

The lifting action as the height of the seat is adjusted can be appreciated best by consideration of the simplified diagrams of FIGS. 4 and 5.

In FIG. 4 the seat is in the lower-most position and it can be raised by releasing the clutch and using the handle 27 to turn the bell crank 16 about the axis 17 in a clockwise direction as seen in FIGS. 2, 4 and 5. The strut 14 lifts the front of the seat and at the same time the link 22 causes the rear bell crank 19 to turn in an anti-clockwise direction so that the rear of the seat is lifted at 18.

FIG. 5 shows five successive positions of the seat and also shows that the lifting is generally vertical and about the same at the front as at the rear. Vertical lifting is the most convenient.

If it is desired that the front of the seat rises proportionately less than the rear of the seat, as is sometimes the case, then the length of the bell crank arms at front and/or rear can be modified.

The arrangement allows easy adjustment of the height of the seat without needing to have any gears.

Each rear bell crank 19 is mounted between two side-by-side webs of the upper slide 12 and this gives stiffening. The front bell cranks 16 are mounted on the inner sides of the slides 12 and are welded to the transverse shaft 25 so that the assembly is rigid in itself.

What is claimed is:

1. A vehicle seat with a front and rear end and having a height adjustment mechanism comprising a pair of cranks; a pivotal link interconnecting the cranks; each crank having a horizontal crank axis, the seat being secured adjacent to the front and rear ends to free ends of the cranks; means for turning one of the cranks, and a pivotal link pivoted to, and interconnecting, the cranks at locations relative to the cranks' axes insuring that the cranks at locations relative to the cranks, axes insuring that the cranks rotate in opposite senses.

2. A seat as claimed in claim 1 in which there are two adjustment mechanisms, one at each side of the seat.

3. A seat as claimed in claim 1 in which one crank includes a pivotal link connecting it to the seat.

4. A seat as claimed in claim 2 including an electric motor for rotating one crank of each mechanism and having a flexible drive cable at each end of the motor connected to one of the cranks at each side.

5. A seat as claimed in claim 2 including a shaft extending transversely underneath the seat defining the pivot axis of one crank at each side of the seat and a handle clutched to the shaft.

6. A seat as claimed in claim 5 in which the clutch is normally engaged to prevent rotation of the cranks, but in which any adjustment movement automatically releases, the clutch until, when movement ceases, the clutch automatically re-engaged.

7. A seat as claimed claim 6 including a coiled spring around the shaft for tending to lift the seat against the weight of an occupant.

8. A seat as claimed in claim 1 in which one crank includes a pivotal link connecting it to the seat.

9. A seat as claimed in claim 5 including a coiled spring around the shaft for tending to lift the seat against the weight of an occupant.

10. A height adjustment mechanism as claimed in claim 1 wherein the pivotal link is attached to one crank below the axis thereof and to the other crank at a location above the axis thereof.

11. A height adjustment mechanism for a component, comprising a pair of cranks, each having a crank axis for supporting the component at two spaced locations, operating means coupled to one of the cranks for driving that crank, and a pivotal link pivoted to and interconnecting the cranks at first and second link attachment locations positioned relative to the crank axes ensuring that the cranks rotate in opposite directions.

12. A height adjustment mechanism as claimed in claim 11 in which the cranks are bell cranks mounted to be rotatable about parallel, spaced-apart, axes.

13. A height adjustment mechanism as claimed in claim 12 in which one arm of one bell crank is connected to one arm of the other bell crank through the pivotal link.

14. A height adjustment mechanism as claimed in claim 13 in which, in the range of movement of each bell crank, one arm moves from below the horizontal axis to above the horizontal axis and the other arm moves generally vertically.

15. A height adjustment mechanism as claimed in claim 11 in which the cranks are mounted on the movable slide of a seat fore-aft slide assembly.

16. Means as claimed in claim 12 in which, in the range of movement of each bell crank, one arm moves from below the horizontal to above the horizontal and the free end of that arm moves generally vertically 17. A height adjustment mechanism as claimed in claim 11 in which the operating means includes an operating handle coupled with the said one crank through a clutch, adapted normally to hold the crank stationary, but to permit rotation of the crank in response to movement of the operating lever.

18. A height adjustment mechanism as claimed in claim 11 wherein the first link attachment location is above the crank axis of one crank and the second link attachment location is below the crank axis of the other crank.

19. A height adjustment mechanism for a vehicle seat wherein the seat has a front end and a rear end and is mounted on a supporting frame for movement between a lower position and an upper position; the mechanism comprising:

a first bell crank, the first bell crank having first and second ends and an intermediate pivot point located between the first and second ends, the first bell crank being pivoted to the support frame at a first horizontal axis aligned with the intermediate pivot point;

a first link having first and second ends, the first end of the link being pivotally attached to the first end of the first bell crank and the second end of the first link being pivotally attached to the seat adjacent the front end thereof;

a second bell crank, the second bell crank having first and second ends and an intermediate pivot point located between the first and second ends, the second bell crank being pivoted to the supporting frame at a second horizontal axis aligned with the intermediate pivot point thereof, the first end of the bell crank being pivoted to the seat adjacent the rear end of the seat;

a second link having first and second ends, the first end of the second link being piovted to the second end of the first bell crank and the second end of the second link being pivoted to the second end of the second bell crank;

operating means connected to the first bell crank for rotating the first bell crank about the intermediate pivot point in a first direction to lift the front end of the seat and by pulling the second link to rotate the second bell crank in a second direction opposite the first direction to lift the rear end of the seat; and when the operating means rotates the first bell crank in the second direction lowering the front end of the seat, the second link pushes the second arm of the second bell crank to rotate in the first direction to lower the first end of the second bell crank and the rear end of the seat, and means for retaining the seat in selected positions between the lower and upper positions.

20. The height adjustment mechanism of claim 19 wherein the operating means includes an electric motor.

21. The height adjustment mechanism of claim 20 wherein the operating means is a hand-operated lever.

22. The height adjustment mechanism of claim 21 further including a spring disposed between the frame and the first bell crank, the spring biasing the first bell crank to rotate in the first direction so as to urge the seat toward the upper position.

23. The height adjustment mechanism of claim 21 wherein the second end of the first bell crank is disposed between the intermediate pivot points of the first and second bell cranks and the first end of the second bell crank is disposed to the rear of the intermediate pivot of the second bell crank with the first link being disposed in front of the intermediate pivot of the first bell crank.

* * * * *